June 28, 1932.   R. R. GRANT   1,865,248

PISTON

Original Filed July 18, 1923

Inventor:
Rudolph R. Grant,
By Albert O'Brien Atty.

Patented June 28, 1932

1,865,248

UNITED STATES PATENT OFFICE

RUDOLPH R. GRANT, OF DAYTON, OHIO

PISTON

Original application filed July 18, 1923, Serial No. 652,402. Divided and this application filed July 7, 1930. Serial No. 466,295.

It is not uncommon for engines, especially of the internal combustion type, to develop after considerable use what is generally known as "piston slap". This is generally occasioned by a wearing of the piston or cylinder walls or both, and when pronounced is usually indicated by a metallic sound or periodic knock in the engine while running.

The present application is a division of my Patent Number 1,772,215, granted Aug. 5, 1930. It contemplates an eliminating of this undesirable slap and provides means hereinafter described for expanding the skirt of the piston, thereby tending to minimize, if not eliminate, the above-described undesirable conditions.

In the detailed description hereinafter set forth, reference will be had to the accompanying drawing. To those skilled in the art it will be apparent that the drawings are representative of the structures involved and changes therein may be made as conditions require without departing from the spirit of the invention.

Figure 1:
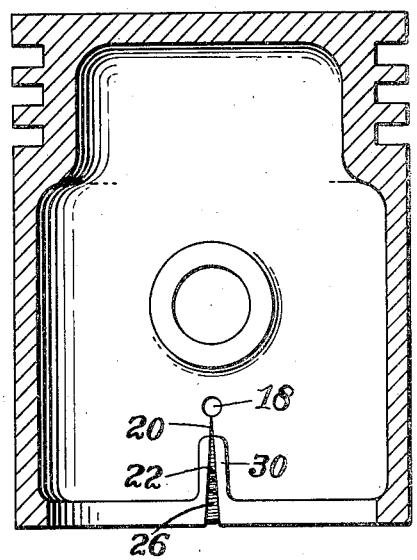
Fig. 1 is a view illustrating the use of my invention for expanding the skirt of a piston.
Figure 2:
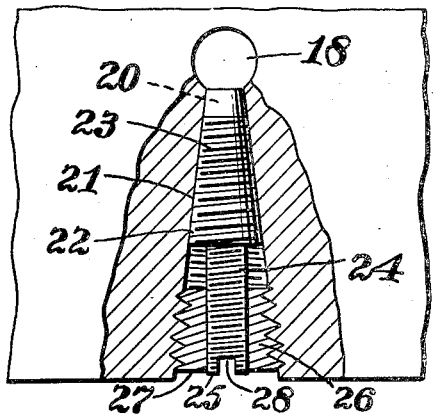
Fig. 2 is an enlarged view showing the expanding member in the skirt of a piston, the drawing being exaggerated for the sake of clearness.

A piston to which my invention may be applied is drilled to form an opening 18 preferably beneath the piston pin—see Fig. 1. The skirt of the piston is bifurcated as at 20 from its base to the opening 18, and an internally threaded and tapered bore 21 provided as shown in Fig. 2.

An expanding member 22 is adapted to enter the bore 21 and expand the piston skirt until the proper clearance between the cylinder and piston has been established. The member 22 consists of a tapered and screw-threaded base 23 and a reduced shank 24, terminating in the head 25. The shank is screw-threaded and adapted to receive an internally and externally threaded collar 26 formed with the same angle of taper as the base 23.

Figure 3:
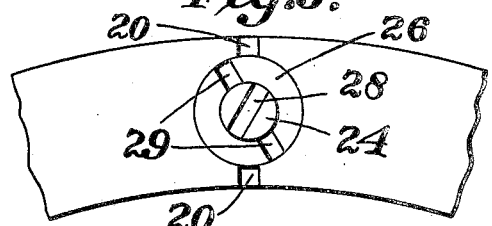
Fig. 3 is a fragmentary view illustrating the heads of the collar and shank of the expanding member.

The collar terminates in a head 27. The corresponding threads upon the base 23 and the exterior of the collar 26 have a different pitch than the corresponding threads on the exterior of the shank 24 and the interior of the collar 26. The heads of the shank and collar are provided with slots 28 and 29, respectively, or other means, see Fig. 3, for the reception of a screw-driver, or proper tool. The collar and shank are so formed that when ready for insertion in the bore 21 the heads of the shank and collar and slots therein are in transverse alignment. A tool is inserted in the aligned slots, and the member is screwed into the tapered bore to an extent necessary to provide the desired expansion of the piston skirt. The tool is then removed, and the expanding member will maintain the selected position under the working condition of the piston, due to the dissimilarity of the pitch of the threads hereinbefore described. To insure a positive lock of the parts in position, the shank or collar may be given a slight reverse turn to positively jam the threads as shown in Fig. 3.

Should it be desirable to retract or remove the member, the slots are first brought into alignment, whereupon the member may be retracted as an entity from the bore.

A boss 30, see Fig. 1, may be provided if necessary, to strengthen the skirt of the piston adjacent the expanding member.

The degree of taper given to the expanding member, and the pitch of the external threads is prefrably such that for each complete revolution of the member the skirt will expand a decimal fraction, for example .001 of an inch. Obviously, any number of expanding members may be used around the skirt of the piston.

What is claimed is:

1. In combination with a piston provided with an opening in the skirt thereof, a member adapted to enter said opening and expand said skirt, and means forming an integral part of said member for locking the member in the selected position.

2. In combination with a piston provided with a threaded opening in the skirt thereof, a threaded member adapted to enter said opening and expand said skirt and means forming an integral part of said member for locking the member in the selected position.

3. In combination with a piston provided with an opening in the skirt thereof, a member adapted to enter said opening on an axis substantially parallel to the working surface of the piston and expand said skirt, and means forming an integral part of said member for locking the member in the selected position.

4. In combination with a piston provided with an opening in the skirt thereof, a member adapted to enter said opening including a tapered and threaded base and shank, a tapered and threaded collar carried by the shank, the threads upon the shank being of different pitch than the threads on the tapered base and exterior of the collar.

5. In combination with a piston provided with an opening in the skirt thereof, a member adapted to enter said opening including a tapered and threaded base, a threaded shank integral therewith and terminating in a slotted head, a tapered collar internally and externally threaded and having a slotted base, carried by the shank, said slot being formed so as to align the base and collar in the proper line of taper.

6. A piston comprising a head having a skirt provided with oppositely disposed longitudinal slots forming a pair of expansible sections, the adjacent edges of said sections being provided with coned threaded apertures, and threaded conically shaped members adapted to be screwed in said coned threaded apertures for effecting an increase in the diameter of the skirt.

In testimony whereof, I have hereunto subscribed my name.

RUDOLPH R. GRANT.